June 14, 1960     E. J. SCHAAF ET AL     2,940,240
HARVESTER FOR VINE CROPS
Original Filed March 15, 1950     4 Sheets-Sheet 3
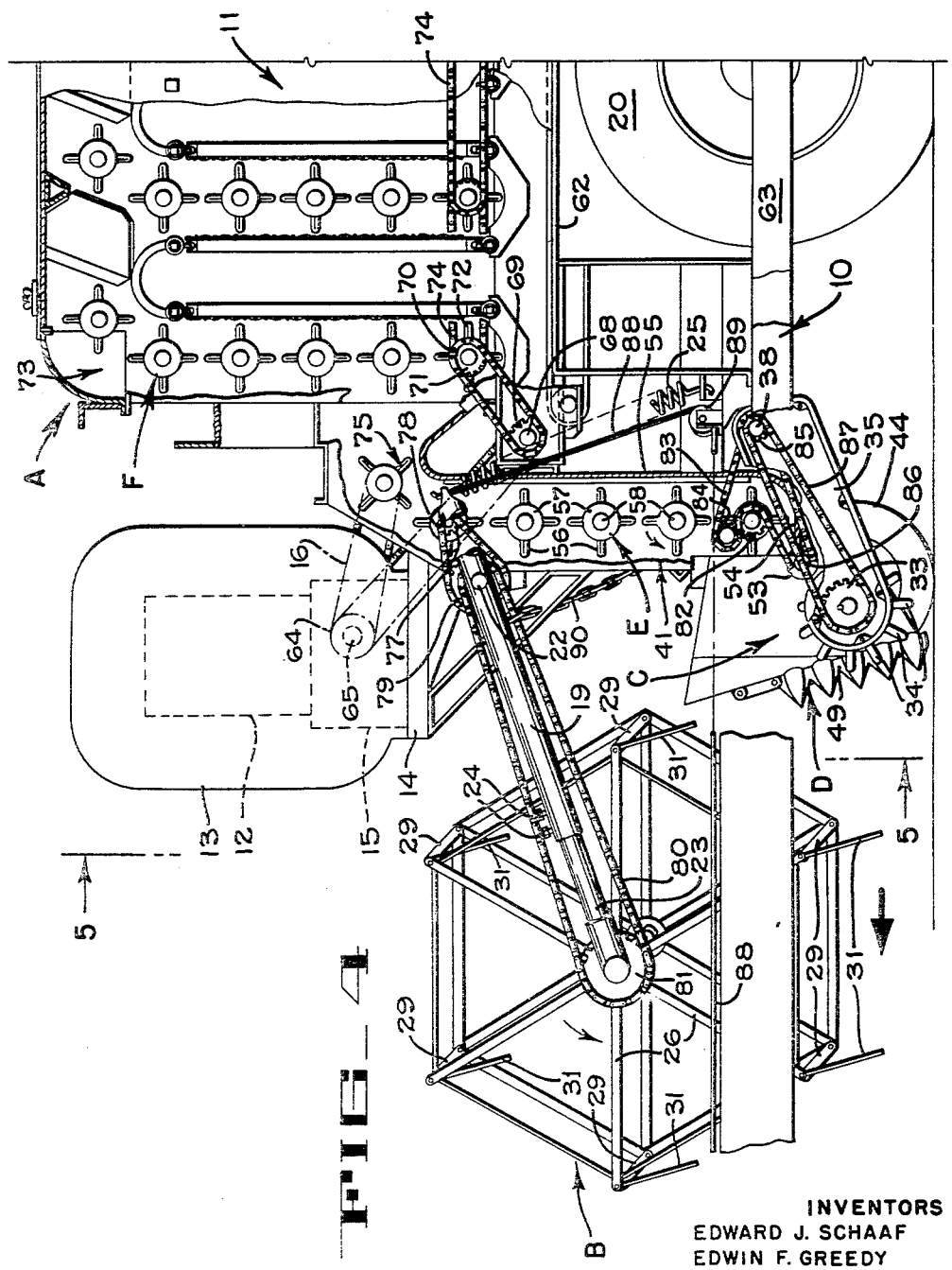
FIG_4
INVENTORS
EDWARD J. SCHAAF
EDWIN F. GREEDY
PHILIP S. DEVIRIAN, JR.
BY Hans G. Hoffmeister
ATTORNEY

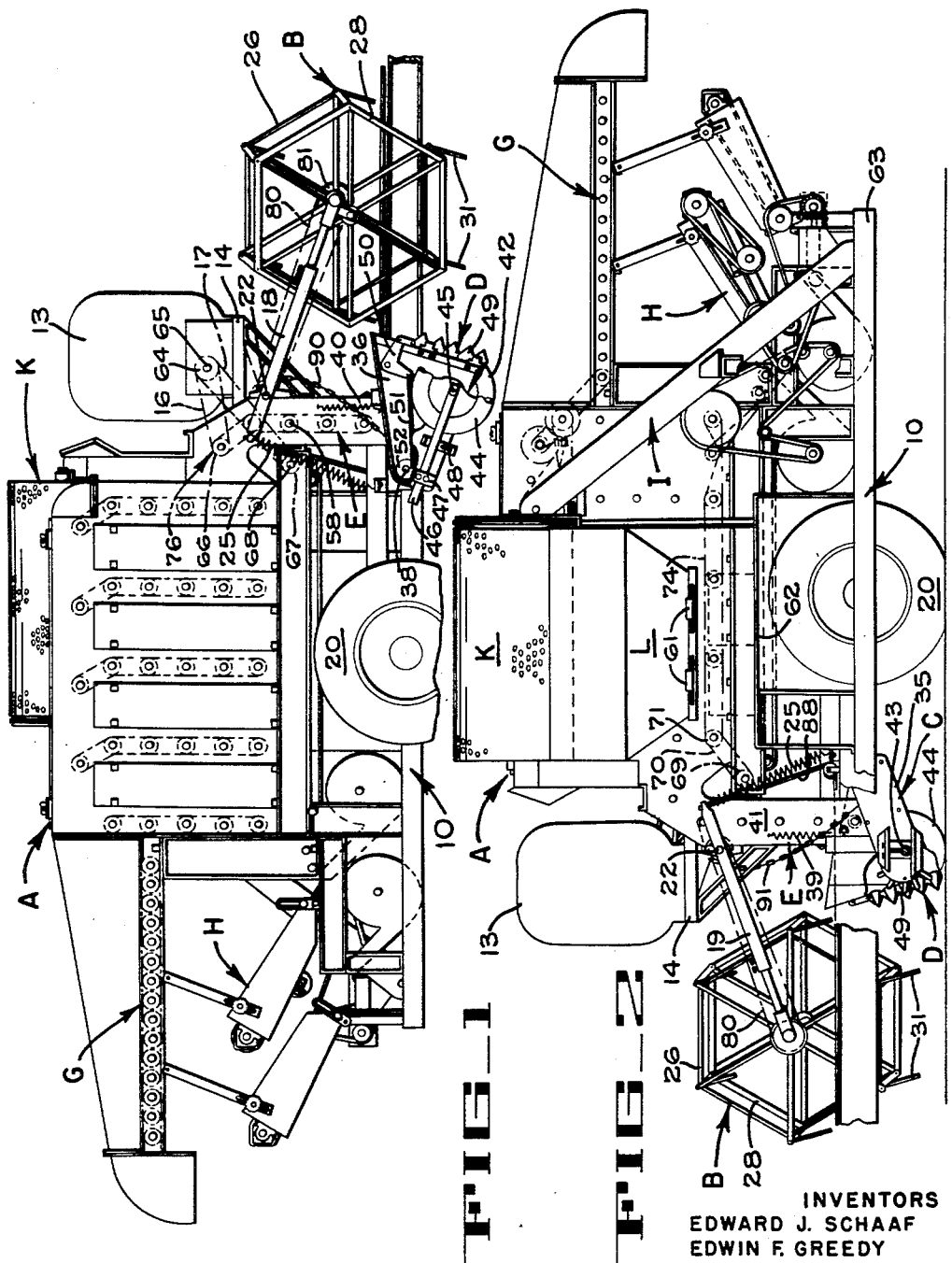

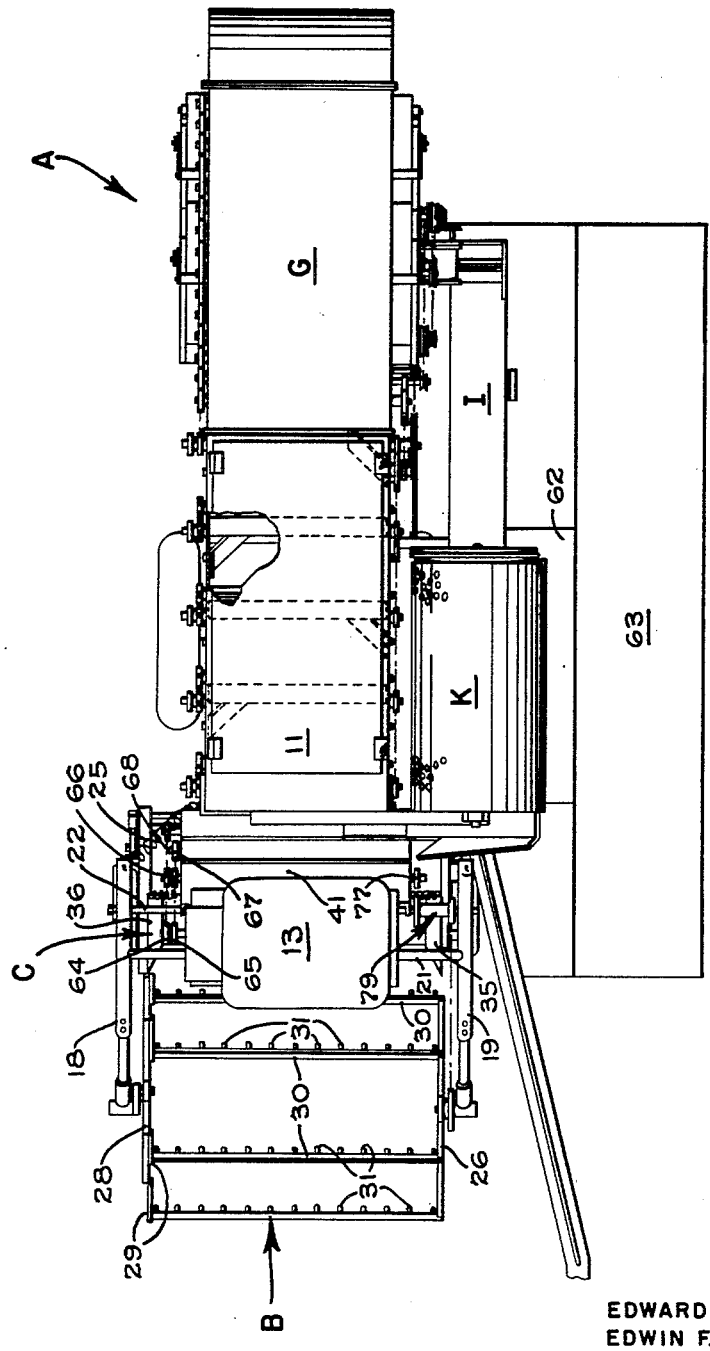

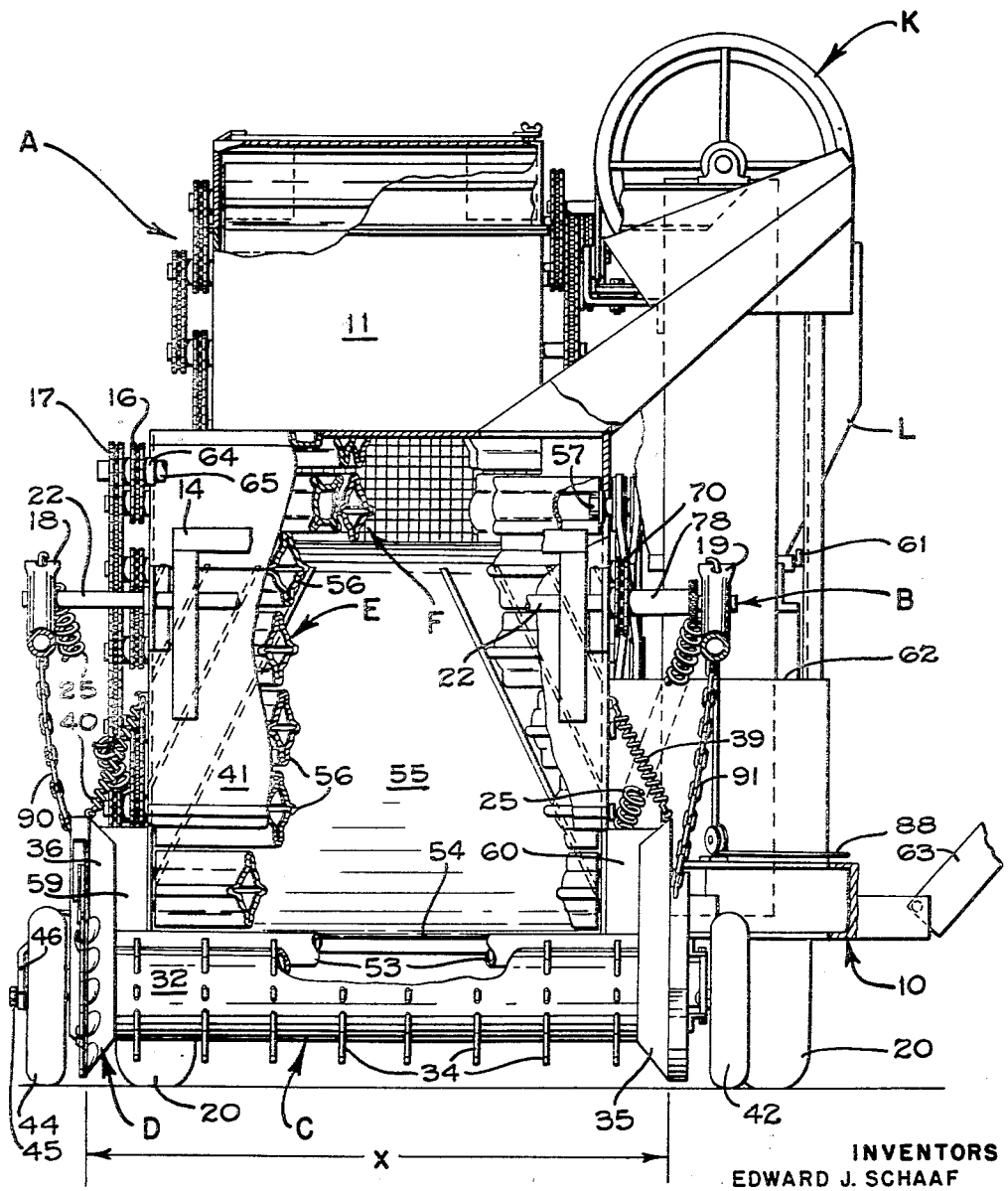
FIG_5

United States Patent Office 2,940,240
Patented June 14, 1960

2,940,240

HARVESTER FOR VINE CROPS

Edward J. Schaaf and Edwin F. Greedy, Hoopeston, Ill., and Philip S. Devirian, Jr., San Jose, Calif., assignors to Food Machinery and Chemical Corporation, San Jose, Calif., a corporation of Delaware Original application Mar. 15, 1950, Ser. No. 149,718, now Patent No. 2,742,045, dated Apr. 17, 1956. Divided and this application Mar. 27, 1956, Ser. No. 574,152

5 Claims. (Cl. 56—21)

The present application is a division of our copending joint U.S. application Serial No. 149,718, filed March 15, 1950, now Patent No. 2,742,045, for Combined Harvesting and Threshing Machine.

The present invention pertains to a combined harvesting and threshing machine, and more particularly relates to a harvester adapted to reap vine crops.

One object of the present invention is to provide in a threshing machine an improved means for reaping or gathering vine crops.

Another object is to provide a machine for gathering a swath of vine crop from a field.

Another object is to provide a vine harvesting machine that will exert tension on the vines great enough to sever the vines from their earth bound roots.

Another object is to provide a vine harvesting machine capable of restricting the forward movement of vines adjoining the swath thereof removed by said machine.

Another object is to provide a harvesting machine which will sever and pick up predetermined portions of a mass of vines lying on the ground and pass the vines into a threshing machine.

These and other objects and advantages of the present invention will become apparent from the following description and the accompanying drawings wherein:

Fig. 1 is a side elevation of a pea harvesting machine embodying the present invention, showing the right hand side of the machine, portions thereof being broken away.

Fig. 2 is a side elevation showing the left hand side of the machine of Fig. 1.

Fig. 3 is a plan view of the machine of Fig. 1, portions thereof being broken away.

Fig. 4 is an enlarged side elevational view of the forward portion of the machine, portions thereof being broken away and parts shown in section to reveal internal structure.

Fig. 5 is a vertical transverse section taken along lines 5—5 of Fig. 4, portions thereof being broken away.

General description

The drawings illustrate a specific embodiment of the invention which is particularly adapted to the harvesting of vine crops such as peas. By means of slight modifications which will be obvious to those familiar with the art, the invention can be employed for use on other crops such, for example, as beans and peanuts. Therefore the words "vines" and "peas" as used herein are intended to mean also such other crops as are capable of being harvested by a mechanism embodying the invention.

While the illustrated form of the invention is provided with support wheels it is obvious that the plants to be threshed could be gathered and brought to the machine which in such instance could be mounted in a cannery yard or other suitable location for stationary use.

The illustrated form of the harvesting machine comprises a two wheeled body portion A adapted to be towed by a suitable powered vehicle such as an ordinary farm tractor, not shown. The hitch to the tractor is offset laterally in a well known manner so that the tractor wheels run on ground cleared of vine growth to avoid damaging the vines. Harvesting means comprising a well known type of tined lifter reel B is mounted ahead of the forward end of the body portion to loosen and comb rearwardly the vines which may be matted on the ground. A vine pick-up device C, also of a well known type, is mounted on the forward end of the body portion A to hook into the mass of vines on the ground, and sever them from the ground. A vertical cutoff device D is mounted adjacent an end of the pick-up device, and is adapted to travel along the unharvested side of a swath of vines being harvested to sever the vines in the swath from the vines adjacent thereto. In some instances the vines cannot be effectively severed from their roots by pulling them loose therefrom and in such cases the vines are first mowed and windrowed in a usual manner, and then the vines are picked up by driving the present harvester along the windrows.

A vertical flight E (Fig. 4) of feed paddle rotors assists in pulling the vines and feeds them upwardly and then rearwardly beneath the lowermost portion of a first vertical flight F of paddle bladed threshing rotors. From here the vines are transported along a tortuous path through the machine where they are beaten, abraded and shaken to free the peas from their pods and to shake the hulled peas from the mass of vines.

The threshed out vines are then discharged onto a discharge conveyor G (Figs. 1 and 2) composed of a plurality of paddle bladed rotors, not shown, which, while conveying the vines rearwardly to a point where they are discharged back onto the field, shake out hulled peas or unopened, detached pods which may still remain in the vines.

Conveying and cleaning mechanism H is positioned to receive the peas and unopened pods which are threshed out of the vines and dropped thereon from the conveyor G. After subjecting them to air cleaning operations the peas and pods are discharged into an elevator I (Fig. 2) which in turn discharges them into a perforated, rotating drum K. Here the hulled peas are separated from the filled pods, the peas are discharged into a suitable receptacle, and the unopened pods are returned into the threshing mechanism for re-processing.

Frame structure and engine

The body A (Fig. 1) comprises a channel iron frame 10 and a box-like, thresher rotor housing 11 of a type common in the manufacture of agricultural machinery wherein structural frame members of angle or channel iron are bolted or welded together, and are covered with sheet metal panels attached to the structural members.

A conventional type of gasoline engine 12 is mounted in a sheet metal housing 13 (Figs. 1 and 2) and is supported on a motor mount bracket 14 extending forwardly from the front end of the body A. The engine is provided with a usual type of speed reducing device 15 to drive a pair of main drive chains 16 and 17 (Figs. 1 and 5) to be referred to later herein in connection with a description of the drive mechanism. Throughout the present description of the machine the terms "right" and "left" will be used to indicate the right and left sides of the machine as it travels forward, or from left to right in Fig. 1, except as otherwise specifically designated.

It will be noted in Fig. 3 that the portion of the box-like housing 11 which houses the threshing rotors F is narrower than the housing for the feed mechanism, and is narrower than the width of the swath indicated at X in Fig. 5. This allows the body support wheels 20 to be mounted at the sides of the narrower threshing rotor housing so that the support wheels ride on ground from which the vines have been removed.

Vine pick-up mechanism

A pair of lifter reel support arms 18 and 19 (Figs. 1, 2 and 3) are rigidly secured to each other by a torque bar 21 (Fig. 3) which is welded at its ends to the arms. The arms 18 and 19 are pivotally mounted on a shaft 22 mounted transversely across the body of the machine and extend forwardly therefrom. The length of the arms is adjustable by means of a telescopically extensible portion 23 (Fig. 4) secured in adjusted position by set screws 24 in the forward end of each support arm. The lifter reel support arms are shown in a properly adjusted position for the harvesting of peas, although in harvesting some crops it is desirable to shorten the arms somewhat, by means of the adjustment, to position the lifter reel close to the pick-up device. A pair of counter-balancing coil springs 25 (Figs. 1, 3, 4 and 5) are connected between the rear ends of the arms 18 and 19, which extend rearwardly beyond the pivot shaft 22, and the frame 10.

The lifter reel B is of a conventional type with a power driven spider 26 at one end thereof, a freely rotating, eccentrically mounted spider 28 at the other end thereof and connected by levers 29 to a plurality of cross rods 30 to each of which a plurality of the tine fingers 31 are secured. By this arrangement the tine fingers 31 are maintained in upright position while the reel B is rotated in the direction of the arrow shown in Fig. 4.

The pick-up device C comprises a cylindrical body portion or drum 32 (Fig. 5), with a drive sprocket 33 (Fig. 4) secured to an end thereof. Picking or lifting fingers 34 are mounted to project radially through rows of slotted openings in the drum 32. The fingers 34 are mounted on a usual eccentric actuating mechanism, not shown, mounted internally of the drum. By means of this well known eccentric actuating mechanism the picking fingers are alternately projected radially outwardly on the lower and forward sides of the rotating drum and then are retracted into the drum on the upper and rearward sides of the drum. The forwardly and downwardly projecting fingers enter into and engage the mass of vines loosened by the lifter reel B and carry the vines up over the top of the pick-up device C, tending to pull them loose from the ground. As the fingers 34 are retracted inwardly to lie flush with the upper, rearward peripheral surface of the drum, they release the vines for feeding into the machine. This type of pick-up device is well known to those familiar with the art and it will be unnecessary to describe it in further detail. However, the feeding means of the present mechanism which co-operate with the pick-up device are important to its successful operation as will be pointed out later herein.

The pick-up device C is journaled between the forward ends of a pair of housings 35 and 36 (Fig. 3) which are pivotally mounted at their rearward ends on a jack shaft 38 (Fig. 4) journaled transversely of the main frame 10. A major portion of the weight of the pick-up device assembly is counterbalanced by a pair of coil springs 39 and 40 (Figs. 1, 2 and 5) which extend from the housings 35 and 36, respectively, to a housing 41 enclosing the feed rotors E. A ground engaging wheel 42 (Fig. 5) is journaled on a stub axle 43 (Fig. 2) secured in adjusted position to the outer side of the left hand housing 35 near its forward end to support the unbalanced weight of the housing. A second ground engaging wheel 44 (Figs. 1 and 5) is journaled on a stub axle 45 (Fig. 1) on the forward end of a wheel support or lever arm 46 which is clamped in adjusted position to a mounting block 47 pivotally mounted on the outer side of the right hand, pivoted, pick-up device, support housing 36 near its rear end.

A yoke 48 (Fig. 1) is mounted in vertically adjusted position on the outer side of the right hand, pick-up device housing 36, the upper and lower ends of the yoke being bent to extend outwardly, to engage and limit the upward and downward pivotal movement of the pivoted wheel supporting arm 46 relatively to the housing 36. The upper, outwardly extending end portion of the yoke 48 normally rests on the arm 46 to support the unbalanced weight of the right hand end of the pick-up device and to carry it over any obstacles which the wheel may roll over. However, if the wheel passes across a depression in the ground the yoke 48 permits the lever arm 46 to swing downward relative to the housing 36 so that the wheel will follow the depression, continuing to press down on the vines beneath it.

The vine cutoff device D is in the nature of a short mowing machine sickle of an ordinary type, disposed vertically, and mounted in the forward end of the right hand support housing 36 (Figs. 1, 2 and 4). A usual serrated sickle knife 49 (Fig. 1) of the cutoff device D is adapted to be reciprocated in a usual manner by a bell crank lever 50, which is oscillated by means of a link 51 connected eccentrically to a rotating disk 52.

The forward ends of the pick-up device support housings 35 and 36 are beveled inwardly to guide the marginal portion of the swath of vines severed by the cutoff device D inwardly onto the drum of the pick-up device C, which (Figs. 3 and 5) is somewhat shorter than the width of the swath, indicated at X in Fig. 5. The cutoff device makes a vertical cut through the mass of tangled vines thereby preventing an excess amount of vines being drawn onto the pick-up device from the unharvested side of the machine. The machine of the present invention is intended to move about a field of peas being harvested, with the left hand side of the pick-up device following along the marginal edge of the field or of a previously harvested swath. Therefore no cutoff mechanism is required on the left hand side of the machine.

Feed mechanism

Rearwardly of the pick-up device C a transfer roller 53 (Fig. 5) is mounted and driven to rotate so that its upper surface travels rearwardly. The mass of vines from the pick-up device C passes rearwardly over the transfer roller 53 and thence (Figs. 4 and 5) onto the lower, forwardly curved apron 54 of a smooth, vertical, sheet metal, feed plate 55, which forms the rear wall of the feed housing 41 for the vertical flight E of paddle bladed feed rotors.

Each of the paddle bladed feed rotors in the flight E thereof, like all of the other paddle bladed rotors in the machine, comprises a sheet metal body portion 56 (Figs. 4 and 5) of hollow, generally cruciform sectional shape, with a forged metal end plug 57 secured co-axially in each end thereof.

A short supporting shaft portion 58 (Fig. 4) is formed concentrically with each of the plug portions 57. Where required, this shaft portion extends axially beyond the journal, not shown, in which it is mounted to receive the various rotor drive sprockets. The feed rotors of the flight E are driven to rotate in a counterclockwise direction as viewed in Figs. 2 and 4.

It will be noted in Figs. 3 and 5 that the housing 41 which encloses the flight E of feed rotors is of somewhat lesser width than the length of the pick-up device C, which in turn, is of lesser length than the width X of the swath severed from the mass of vines in the field by the cutoff device D. A pair of angularly mounted guide plates 59 and 60 are mounted one at each side of the forwardly curved lower portion of the plate 55 to guide the vines from the pick-up device into the entrance to the feed rotor housing 41.

The spacing between adjacent rotors is such that their blades have a minimum clearance from each other of not less than the diameter of the peas to be threshed. The maximum separation between blades of adjacent rotors is that which will prevent the vines from being carried along from one rotor to the next.

A hopper L is mounted beneath the pod separating drum K to catch the peas passing outwardly through the perforations in the drum K. A pair of discharge control slides 61 are provided to control the flow of peas from the hopper L into usual field boxes, shown in broken lines in Fig. 2, which may be placed on a platform 62 provided therefor over the wheel 20. A folding platform 63 is hingedly mounted on the side of the machine adjacent the hopper L to provide working space for an operator. The platform is adapted to be swung upwardly alongside the platform 62 to reduce the width of the machine when transporting it along a road or highway.

Drive mechanism

The drive mechanism of the illustrated machine comprises principally a series of sprockets, chains, pulleys and belts. From double sprockets 64 secured to a take-off shaft 65 (Figs. 1, 3, 4 and 5) of the speed-reducer 15, driven by the engine 12, the two main drive chains 16 and 17 are passed around sprockets 66 and 67, respectively.

The sprocket 67 is mounted on the right hand end of a jack shaft 68 which extends through the housing 11 of the machine and has a sprocket 69 (Figs. 1, 2 and 4) on its other or left hand end. A chain 70 passes around the sprocket 69 and also around a sprocket 71 on the left hand end of the lowermost threshing paddle rotor 72 in the first flight 73 of threshing rotors F. The shaft of the lowermost threshing rotor of each flight thereof has a double sprocket on its left hand end, whereby, by means of a plurality of short drive chains 74 (Fig. 4) the threshing rotors are driven.

The upper main drive chain 16 from the speed reducer 15 (Figs. 1 and 4) passes around the sprocket 66 on the right hand end of the shaft of a feed transfer paddle rotor 75. A series 76 of double sprockets and short chains (Fig. 1) are provided, also on the right hand side of the machine to drive the feed rotors of the flight E in the same manner as described previously herein for the vertical flights of threshing paddle rotors.

A sprocket 77 (Fig. 4) is mounted on the left hand end of the shaft of the uppermost feed paddle rotor, and a chain 78 passes around the sprocket 77 and around one portion of a double sprocket 79, journaled on the pivotal support shaft 22 for the lifter reel arms 18 and 19, (Fig. 5). A chain 80 passes around a second portion of the double sprocket 79 (Figs. 1 and 4) and also around a sprocket 81 mounted to drive the lifter reel B. In order to drive the pick-up device and the cutoff device a sprocket 82 (Fig. 4) is secured to the shaft of the lowermost feed rotor, and a chain 83 passes around this sprocket, around an idler sprocket 84, around a double sprocket 85 secured to the jack shaft 38, and around a sprocket 86 secured to the shaft of the small transfer roller 53 just rearwardly of the upper side of the toothed pick-up device C. A chain 87 for driving the pick-up device passes around the sprocket 85 on the jack shaft 38 and around the sprocket 33 of the pick-up device C.

For elevating the lifter reel B, the pick-up device C, and their associated parts to an inoperative position, a cable 88 (Fig. 4) is connected to the rearwardly extending end of the lifter reel support arm 19. The cable 88 passes beneath a pulley 89 mounted on the thresher frame 10 and thence forwardly, where it is connected to suitable actuating means, not shown, for operation by the tractor operator.

Chains 90 and 91 are connected between the spring counterbalanced, lifter reel, support arms 18 and 19 and the similarly counterbalanced, pivoted, end housings 35 and 36 of the pick-up device C, so that when the lifter reel B is swung upwardly to inoperative position by the tractor operator, the pick-up device C also will be swung upwardly therewith. The chains are of sufficient length so that when the lifter reel B is lowered to its operating position, as shown in Figs. 1, 2 and 4, the chains will hang slack and will not interfere with the normal pivotal movement of the pick-up device housings 35 and 36 as their support wheels 42 and 44 follow irregularities in the terrain over which they pass.

Operation

Assuming that the machine is at one side of a field of peas wherein the pea vines are more or less matted together on the ground in the usual manner of such fields, the machine is preferably headed so that an initial swath will be cut with the left hand side of the machine following along an edge of the peas in the field so that the vertical cutter D will make a cut in the vines thereby forming a swath of the desired width indicated at X in Fig. 5. Thereafter the machine preferably is operated so that the cutter D will remain on the unharvested side of successive swaths to be cut.

With the engine 12 operating and connected by usual clutch means, not shown, to drive the main drive chains 16 and 17, the various mechanisms are driven as described previously herein. The tractor operator lowers the lifter reel B to a desired adjusted position, by slackening off the cable 88 to a desired degree. With the lifter reel thus lowered, the chains 90 and 91 are of sufficient length to lower the pick-up device to supported position on its ground engaging wheels 42 and 44.

The tines of the lifter reel B enter into the mass of vines in the usual manner for such reels, and, by lifting the vines slightly and in effect combing them rearwardly, they position the vines so that the eccentrically supported fingers 34 of the pick-up device C, in their projected position on the forward side of the drum 32, can enter into the mass and engage the vines and carry them upwardly and rearwardly over the top of the drum. The springs 39 and 40 allow a portion of the weight of the pick-up device assembly to remain unbalanced and this unbalanced weight is supported by the pick-up device support wheels 42 and 44.

When operating over smooth terrain the pivoted arm 46 upon which the right hand, pickup device, support wheel 44 is mounted abuts against the out-turned upper end of the yoke 48 to support the pick-up device with the lower end of the sickle D just above ground level and to elevate it when the wheel passes over a bump on the ground. Should the wheel 44 or vine holding means pass over a hole or depression in the ground however, the lever arm 46 allows the wheel to swing downward and remain in pressing contact with the vines beneath it. This is important with some vines which are difficult to cut, since the wheel pressure tends to grip the vines on the field side and to draw any unsevered vines which might start to bunch up ahead of the sickle into the serrations between the sickle teeth for severing.

The vertical cutter D severs the vines along the right hand side of the swath being harvested, and the beveled forward sides of the pivoted, pick-up device, end housings 35 and 36 guide the sides of the vine mass laterally inwardly onto the pickup device. As the vines are carried up over the top of the pick-up drum 32 (Figs. 4 and 5) the transfer roller 53 prevents the vines from following down the rear side of the pick-up drum and directs them rearwardly onto the forwardly curved apron 54 at the lower end of the feed housing 41. Here the vines are seized between the plate 55 and the lowermost feed rotor of the flight E thereof. The tension exerted on the vines by the action of the feed rotors, plus the action of the drum fingers 34, pulls the vines loose from the ground.

As the fingers 34 pass rearwardly beyond the top of the drum, they are retracted into their slots to lie flush with the rearward upper side of the drum, thereby releasing the vines. Occasionally tough and firmly rooted vines will successfully resist the combined pulling action of the pick-up device and feed rotors, but the leaves and pods are stripped from such vines and are carried up into the threshing mechanism with the other vines.

The detached mass of vines is carried upwardly between the rear sides of the feed rotors and the smooth rigid feed housing plate 55.

The smoothness and rigidity of the plate 55, reduces to a minimum any threshing action the feed paddles might have on the vines, so that the vines are carried up with a minimum loss of peas and pods. The vines are subjected to very little vibration during this upward feeding pass, and therefore, such pods and peas as may be freed during this feeding pass are mostly carried up with the vines.

In transporting the machine along a road or highway the lifter reel B is swung by the tractor operator to an elevated position by means of the forwardly extending run of the cable 88 (Fig. 4). The chains 90 and 91 simultaneously swing the pick-up device assembly upwardly, raising the wheels 42 and 44 from ground engagement. By swinging the hinged platform 63 upwardly to a vertical position alongside the machine and securing it in such position by suitable latch means, not shown, the width of the machine may be reduced to avoid obstruction of traffic.

While we have described a preferred embodiment of the present invention it will be understood however that various changes and modifications may be made in the details thereof without departing from the spirit and scope of the appended claims.

Having thus described the invention what we claim and desire to protect by Letters Patent is:

1. In a vine harvesting machine, a body adapted to be moved about a field of unharvested vine crops, a pick-up device mounted on said body and disposed transversely of the path of travel of said body for engaging a mass of vines, a cutter carried by said body and disposed laterally of said pick-up device for severing a strip of vines engaged by said pick-up device, and vine holding means mounted on said body and disposed laterally of said cutter and in engagement with the ground to press the vines against the ground for applying a holding pressure on the vines being severed and to restrain the movement of vines that are not engageable by said pick-up device, said pick-up device, cutter and vine holding means being in substantial alignment with one another transversely of the machine body.

2. In a vine harvesting machine, a body adapted to be moved about a field of unharvested vine crops, a pick-up device mounted on said body and disposed transversely of the path of travel of said body for engaging one end of a mass of vines, vine holding means mounted on said body and disposed laterally of said pick-up device in position to bear against the ground and press the other end of the mass of vines against the ground for applying a holding pressure on said other end of the mass of vines, and a substantially upright cutter carried by said body intermediate said pick-up device and said vine holding means for severing a strip of vines engageable by said pick-up device from the vines held by said vine holding means, said pick-up device, cutter and vine holding means being in substantially alignment with one another transversely of the machine body.

3. In a vine harvesting machine, a body adapted to be moved about a field of unharvested vine crops, a pick-up device mounted on said body and disposed transversely of the path of travel of said body for engaging a mass of vines, a substantially upright vine cutter carried by said body and disposed laterally and forwardly of said pick-up device for severing a strip of vines engageable by said pick-up device, ground-engaging vine holding means disposed laterally and rearwardly of said cutter and in substantial alignment with said pickup device to press the vines against the ground to apply a holding pressure on the vines being severed and to restrain the movement of the vines that are not engageable by said pickup device, and means mounting said vine holding means on said body for vertical movement relative to said body for enabling said vine holding means to follow the contour of the field.

4. In a vine harvesting machine, a body adapted to be moved about a field of unharvested vine crops, a pick-up device mounted on said body and disposed transversely of the path of travel of said body for engaging a mass of vines, a substantially upright vine cutter carried by said body and disposed laterally and forwardly of said pick-up device for severing a strip of vines engageable by said pick-up device, and a ground-engaging vine holding wheel rotatably mounted on said body and disposed laterally and rearwardly of said cutter and in substantial alignment with said pick-up device to press the vines against the ground and apply a holding pressure on the vines being severed and to restrain the movement of vines that are not engageable by said pick-up device.

5. In a vine harvesting machine, a body adapted to be moved about a field of unharvested vine crops, a pair of spaced transversely aligned support members mounted on said body, a pickup device mounted between said support members and disposed transversely of the path of travel of said body for engaging a mass of vines, a cutter carried by one of said support members and disposed laterally of said pick-up device for severing a strip of vines engaged by said pick-up device, each of said support members being formed with a beveled surface for guiding vines severed by said cutter toward said pick-up device, and ground-engaging vine holding means mounted on said one support member and disposed laterally of said cutter to press the vines against the ground and apply a holding pressure on the vines being severed and to restrain the movement of vines that are not engageable by said pick-up device.

References Cited in the file of this patent
UNITED STATES PATENTS

| | | |
|---|---|---|
| 608,325 | Farrall et al. | Aug. 2, 1898 |
| 2,240,066 | Bingham | Apr. 29, 1941 |
| 2,284,777 | Sund | June 2, 1942 |
| 2,388,212 | McElhoe et al. | Oct. 30, 1945 |
| 2,481,528 | Nolt | Sept. 13, 1949 |
| 2,509,371 | Schroeppel | May 30, 1950 |
| 2,547,355 | Young | Apr. 3, 1951 |
| 2,703,953 | Altemus | Mar. 15, 1955 |